US007579114B2

United States Patent
Ohzuku et al.

(10) Patent No.: US 7,579,114 B2
(45) Date of Patent: Aug. 25, 2009

(54) METHOD OF PREPARING POSITIVE ELECTRODE ACTIVE MATERIAL

(75) Inventors: Tsutomu Ohzuku, Nara (JP); Hiroshi Yoshizawa, Osaka (JP); Masatoshi Nagayama, Osaka (JP)

(73) Assignees: Panasonic Corporation, Osaka (JP); Osaka City University, Osaka (JP)

( * ) Notice: Subject to any disclaimer, the term of this patent is extended or adjusted under 35 U.S.C. 154(b) by 344 days.

(21) Appl. No.: 11/531,887

(22) Filed: Sep. 14, 2006

(65) Prior Publication Data

US 2007/0009424 A1 Jan. 11, 2007

Related U.S. Application Data

(62) Division of application No. 10/242,052, filed on Sep. 12, 2002.

(30) Foreign Application Priority Data

Sep. 13, 2001 (JP) ............................. 2001-278536

(51) Int. Cl.
- H01M 4/04 (2006.01)
- H01M 4/50 (2006.01)
- H01M 4/52 (2006.01)

(52) U.S. Cl. .................. 429/231.1; 29/623.1; 429/223; 429/224; 429/231.3; 429/221

(58) Field of Classification Search ............ 429/231.1, 429/231.3, 223, 224, 221; 29/623.1
See application file for complete search history.

(56) References Cited

U.S. PATENT DOCUMENTS

| 5,160,712 A | 11/1992 | Thackeray |
| 5,264,201 A | 11/1993 | Dahn et al. |
| 5,370,948 A | 12/1994 | Hasegawa et al. |
| 5,393,622 A | 2/1995 | Nitta et al. |
| 5,626,635 A | 5/1997 | Yamaura et al. |
| 5,629,110 A | 5/1997 | Kobayashi et al. |
| 5,677,087 A | 10/1997 | Amine |

(Continued)

FOREIGN PATENT DOCUMENTS

EP  0 554 906 A1  8/1993

(Continued)

OTHER PUBLICATIONS

A. R. West, "Introduction to Solid-State Chemistry"; Japan; Title Page, Table of Contents and pp. 170-171, 186-187 and p. 322 (with partial translation) (Mar. 20, 1996).

(Continued)

*Primary Examiner*—Tracy Dove
(74) *Attorney, Agent, or Firm*—Panitch Schwarze Belisario & Nadel LLP

(57) ABSTRACT

A positive electrode active material for a non-aqueous electrolyte battery comprising a lithium-containing transition metal oxide, produced with the use of a dry precursor obtained by: introducing an alkaline solution together with an aqueous solution containing two or more of transition metal salts or two kinds or more of aqueous solutions of different transition metal salts into a reaction vessel to obtain a hydroxide or an oxide as a precursor through coprecipitation with a reductant being coexistent or an inert gas being supplied; and drying the precursor at 300 to 500° C. to obtain a dry precursor.

8 Claims, 9 Drawing Sheets

U.S. PATENT DOCUMENTS

| | | | |
|---|---|---|---|
| 5,738,957 A | 4/1998 | Amine | |
| 5,783,333 A | 7/1998 | Mayer | |
| 5,981,106 A | 11/1999 | Amine | |
| 5,985,237 A | 11/1999 | Lu et al. | |
| 6,007,947 A | 12/1999 | Mayer | |
| 6,045,771 A | 4/2000 | Matsubara | |
| 6,168,887 B1 | 1/2001 | Dahn et al. | |
| 6,277,521 B1 | 8/2001 | Gao | |
| 6,291,107 B1 | 9/2001 | Shimizu | |
| 6,352,794 B1 | 3/2002 | Nakanishi et al. | |
| 6,379,842 B1 | 4/2002 | Mayer | |
| 6,416,902 B1 | 7/2002 | Miyasaka | |
| 6,436,577 B1 | 8/2002 | Kida et al. | |
| 6,613,479 B2 | 9/2003 | Fukuzawa et al. | |
| 6,660,432 B2 | 12/2003 | Paulsen | |
| 6,749,648 B1 | 6/2004 | Kumar | |
| 6,753,111 B2 | 6/2004 | Kweon et al. | |
| 6,773,852 B2 | 8/2004 | Cho et al. | |
| 6,808,848 B2 | 10/2004 | Nakanishi et al. | |
| 6,964,828 B2 | 11/2005 | Lu | |
| 2002/0009645 A1 | 1/2002 | Shima et al. | |
| 2002/0053663 A1* | 5/2002 | Ito et al. | 252/518.1 |
| 2002/0197532 A1 | 12/2002 | Thackeray et al. | |
| 2003/0082448 A1 | 5/2003 | Cho et al. | |
| 2003/0082452 A1 | 5/2003 | Ueda | |
| 2003/0087154 A1 | 5/2003 | Ohzuku | |
| 2003/0129496 A1 | 7/2003 | Kasai et al. | |
| 2003/0170540 A1 | 9/2003 | Ohzuku | |
| 2003/0207176 A1 | 11/2003 | Yoon | |
| 2004/0072072 A1 | 4/2004 | Suzuki | |
| 2004/0110063 A1 | 6/2004 | Uchitomi et al. | |
| 2004/0126660 A1 | 7/2004 | Ohzuku | |
| 2005/0064282 A1 | 3/2005 | Inagaki | |
| 2005/0079416 A1 | 4/2005 | Ohzuku | |
| 2005/0147889 A1 | 7/2005 | Ohzuku | |
| 2005/0260496 A1 | 11/2005 | Ueda | |
| 2005/0271576 A1 | 12/2005 | Awano et al. | |
| 2006/0099508 A1 | 5/2006 | Thackeray et al. | |
| 2006/0204847 A1 | 9/2006 | Ohzuku | |

FOREIGN PATENT DOCUMENTS

| | | |
|---|---|---|
| EP | 0 630 064 A1 | 12/1994 |
| EP | 0 744 780 A1 | 11/1996 |
| EP | 0 806 397 A1 | 11/1997 |
| EP | 1 026 765 A1 | 8/2000 |
| EP | 1 073 136 A2 | 1/2001 |
| EP | 1 295 851 A1 | 3/2003 |
| JP | 63-121258 | 5/1988 |
| JP | 4-267053 | 9/1992 |
| JP | 05-242891 | 9/1993 |
| JP | 5-283076 | 10/1993 |
| JP | 05-283076 A | 10/1993 |
| JP | 6-096768 | 4/1994 |
| JP | 7-037576 | 2/1995 |
| JP | 2002-576035 | 8/1995 |
| JP | 7-320784 | 12/1995 |
| JP | 7-335261 | 12/1995 |
| JP | 08-138670 A | 5/1996 |
| JP | 08-171910 A | 7/1996 |
| JP | 08171910 A | 7/1996 |
| JP | 08-213015 A | 8/1996 |
| JP | 08217452 | 8/1996 |
| JP | 09-055210 | 2/1997 |
| JP | 09-92285 | 4/1997 |
| JP | 9-129229 A | 5/1997 |
| JP | 09-129230 A | 5/1997 |
| JP | 09129230 A | 5/1997 |
| JP | 9-171824 | 6/1997 |
| JP | 09-199127 | 7/1997 |
| JP | 09-231973 | 9/1997 |
| JP | 10-27609 | 1/1998 |
| JP | 10-27626 | 1/1998 |
| JP | 10-69922 | 3/1998 |
| JP | 10-81521 | 3/1998 |
| JP | 10069910 A | 3/1998 |
| JP | 10 199525 | 7/1998 |
| JP | 10-208744 | 8/1998 |
| JP | 10-310433 | 11/1998 |
| JP | 10-316431 A | 12/1998 |
| JP | 11-1323 A | 1/1999 |
| JP | 11 025980 | 1/1999 |
| JP | 11-60243 | 3/1999 |
| JP | 11-060246 A | 3/1999 |
| JP | 11071115 | 3/1999 |
| JP | 11-167919 A | 6/1999 |
| JP | 11-310416 | 9/1999 |
| JP | 11-292547 A | 10/1999 |
| JP | 11-307094 | 11/1999 |
| JP | 11 339 802 A | 12/1999 |
| JP | 2000-077071 | 3/2000 |
| JP | 2000 82466 A | 3/2000 |
| JP | 2000 133262 | 5/2000 |
| JP | 2000-133262 | 5/2000 |
| JP | 2000-149923 A | 5/2000 |
| JP | 200149942 | 5/2000 |
| JP | 2000-182618 A | 6/2000 |
| JP | 2000-195514 A | 7/2000 |
| JP | 2000-223122 | 8/2000 |
| JP | 2000-251892 | 9/2000 |
| JP | 2000-268874 A | 9/2000 |
| JP | 2000-323123 A | 11/2000 |
| JP | 2000 340230 | 12/2000 |
| JP | 2001-023640 A | 1/2001 |
| JP | 2001-035495 A | 2/2001 |
| JP | 2001-210324 | 3/2001 |
| JP | 2001085006 | 3/2001 |
| JP | 2001-185145 A | 6/2001 |
| JP | 2001-185153 A | 7/2001 |
| JP | 2001-192210 A | 7/2001 |
| JP | 2001-202959 | 7/2001 |
| JP | P2001-195353 A | 7/2001 |
| JP | 2001-243952 | 9/2001 |
| JP | 3244314 | 10/2001 |
| JP | 2001-332261 A | 11/2001 |
| JP | 2002 388250 | 11/2001 |
| JP | 2002-042813 | 2/2002 |
| JP | 2002-042813 A | 2/2002 |
| JP | P2002-42813 A | 2/2002 |
| JP | 2002-100358 A | 4/2002 |
| JP | 2002-145623 A | 5/2002 |
| JP | 2002-158011 A | 5/2002 |
| JP | 2002-304993 | 10/2002 |
| JP | 2003059490 | 2/2003 |
| JP | 2003 137555 | 5/2003 |
| JP | 2003-221236 A | 8/2003 |
| JP | 2004-002141 A | 1/2004 |
| WO | WO 98/57386 | 12/1998 |
| WO | 01/99215 A1 | 12/2001 |
| WO | WO 02/40404 A1 | 5/2002 |
| WO | WO 03/015198 A2 | 2/2003 |

OTHER PUBLICATIONS

Yoshio et al., "Lithium-Ion Secondary Battery"; Title Page, Table of Contents, pp. 2-6 (with partial translation) (Mar. 29, 1996).

Lu et al, "Superlattice Ordering of Mn, Ni, and Co in Layered Alkali Transition Metal Oxides with P2, P3 and O3 Structures", Chemistry Mater, 12, pp. 3583-3590 (2000).

D. P. Abraham et al, "Surface Changes on $LiNi_{0.8}Co_{0.2}O_2$ Particles During Testing of High-Power Lithium-ion Cells", Electrochemistry Communications, 4, pp. 620-625 (2002).

K. Saka al., Study of Crystal Electron Microscope, Uchida Rokakuho Publishing Co., Ltd., Tokyo, Japan; Title Page, Table of Contents and pp. 108-113 (with partial translation) (1997).

Society of Japan Electron Microscope Kanto Branch, "Technique of Electron Microscope for Advanced-Material Evaluation", Japan, Title Page, Table of Contents and pp. 30-37 (with partial translation) (1991).

S. Kato, "Analysis of X-Ray Diffraction", Uchida Rokakuho Publishing Co., Ltd., Tokyo, Japan, Title Page, Table of Contents, pp. 201-205 with additional pages (with partial translation) (1990).

J.R. Dahn, et al. "Layered Li [Nixco1-2xMnx] O2 Cathode Materials for Lithium-Ion Batteries", Electrochemical and Solid-State Letters, A200-A203 (2001).

Cho et al., "Preparation of Layered Li[Ni1/3Mn1/3Co1/3]O2 as a Cathode for Lithium Secondary Battery by Carbonate Coprecipitation Method", *Chemistry Letters*, vol. 33, No. 6, pp. 704-805 (2004). The Chemical Society of Japan.

Lu et al., "Layered Cathode Materials Li[Ni$_x$Li$_{(frax;1;3-frax;2x;3)}$Mn$_{(frax;2;3-frax;x;3)}$]O$_2$ for Lithium-Ion Batteries", *Electrochemical and Solid-State Letters*, vol. 4, No. 11, pp. A191-A194 (2001).

Park et al., "Relationship Between Chemical Bonding Character and Electrochemical Performance in Nickel-Substituted Lithium Manganese Oxides", *J. Phys. Chem. B* vol. 105, No. 21, pp. 4860-4866 (2001).

Neudecker et al., "Lithium Manganese Nickel Oxides Li$_x$(Mn$_y$Ni$_{1-y}$)$_{2-x}$O$_2$, I. Synthesis and Characterization of Thin Films and Bulk Phases", *J. Electrochem. Soc.*, vol. 145(12), pp. 4148-4159 (1998).

Yoshio et al., "Preparation and Properties of LiCo$_y$Mn$_x$Ni$_{1-x-y}$O$_2$ as a Cathode for Lithium Ion Batteries", *Journal of Power Sources*, vol. 90, pp. 176-181 (2000).

Lu et al., "Layered Li[Ni$_x$CO$_{1-2x}$Mn$_x$]O$_2$ Cathode Materials for Lithium-Ion Batteries", *Electrochemical and Solid-State Letters*, vol. 4 (12), pp. A200-A203 (2001).

Terada et al., "In Situ XAFS Analysis of Li(Mn,M)$_2$O$_4$ (M=Cr, Co, Ni) 5 V Cathode Materials for Lithium-Ion Secondary Batteries", *Journal of Solid State Chemistry*, vol. 156, pp. 286-291 (2001).

Ueda et al., "Solid-State Redox Reactions of LiNi$_{frax;1;2}$Co$_{frax;1;2}$O$_2$ (R3m) for 4 Volt Secondary Lithium Cells", *J. Electrochem. Soc.*, vol. 141, No. 8, pp. 2010-2014 (1994).

Spahr et al., "Characterization of Layered Lithium Nickel Manganese Oxides Synthesized by a Novel Oxidative Coprecipitation Method and Their Electrochemical Performance as Lithium Insertion Electrode Materials", *J. Electrochem. Soc.*, vol. 145, No. 4, pp. 1113-1120 (1998).

Kanno et al., "Structure and Physical Properties in Cathode Materials for Lithium Secondary cells-Lithium Nickel Oxides and Lithium Manganese Oxides", *Department of Chemistry, Faculty of Science, Kobe University*, pp. 85-95 (1998).

Arai, et al., "Electrochemical and Thermal Behavior of LiNi$_{1-z}$M$_z$O$_2$(M=Co, Mn, Ti)", *J. Electrochem. Soc.*, vol. 144, No. 9, pp. 3117-3125 (1997).

Ohzuku et al., Chemistry Letters, vol. 30, No. 7, pp. 642-643 (2001).

Ohzuku et al., Chemistry Letters, vol. 30, No. 8, pp. 744-745 (2001).

Lu et al., "Synthesis, Structure, and Electrochemical Behavior of Li[Ni$_x$Li$_{(frax;1;3-frax;2x;3)}$Mn$_{(frax;2;3-frax;x;3)}$]O$_2$", *Journal of the Electrochemical Society*, vol. 149(6), pp. A778-A791 (2002).

Caurant et al., "Preparation by a 'chimie douce' route and characterization of LiNi$_z$Mn$_{1-z}$O2 (0.5≦z≦1) Cathode Materials", *J. Mater. Chem.*, vol. 6(7), pp. 1149-1155 (1996).

Grush et al., "Correlating Electronic Structure with Cycling Performance of Substituted LiMn$_2$O$_4$ Electrode Materials: A Study Using the Techniques of Soft X-ray Absorption and Emission", *Chem. Mater*, vol. 12, pp. 659-664 (2000).

Zhong et al., "Synthesis and Electrochemistry of LiNi$_x$Mn$_{2-x}$O$_4$", *J. Electrochem. Soc.*, vol. 144, No. 1, pp. 205-213 (1997).

Rossen et al., "Structure and electrochemistry of Li$_x$MnyNi$_{1-y}$O$_2$", *Solid State Ionics*, vol. 57, pp. 311-318 (1992).

Ohzuku, "Synthesis and Characterization of LiAl1/4Ni3/4O2 (R3m) for Lithium-ion (Shuttlecock) Batteries", The Electrochemical Society, Inc., *J. Electrochem. Soc.*, vol. 42 (12), pp. 4033-4039 (1995).

European Search Report dated Aug. 6, 2008 from the European Patent Office for European Patent Application No. 04 25 6668.7.

\* cited by examiner

F I G. 1
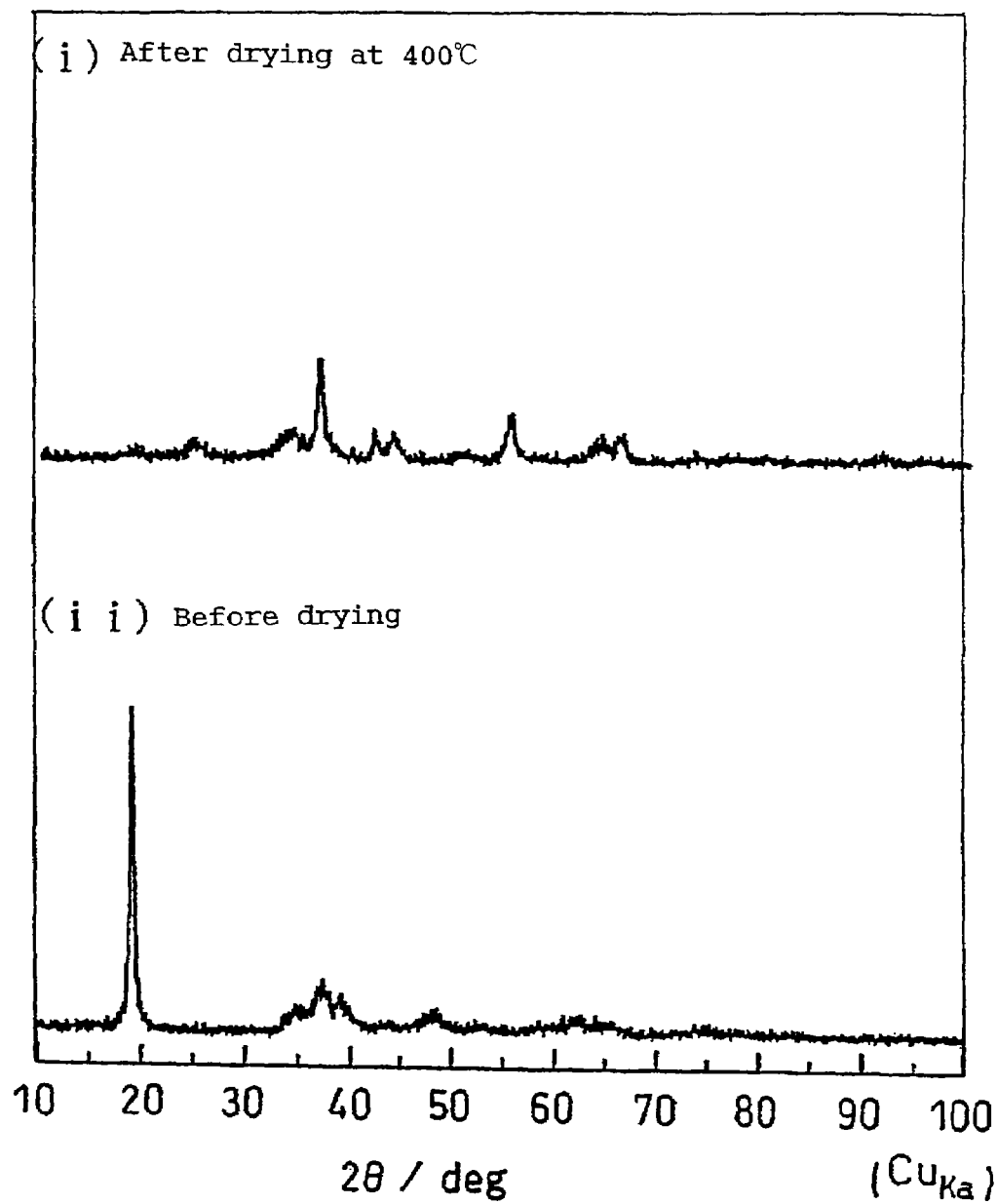

METHOD OF PREPARING POSITIVE ELECTRODE ACTIVE MATERIAL

CROSS-REFERENCE TO RELATED APPLICATIONS

This is a division of co-pending application Ser. No. 10/242,052, filed Sep. 12, 2002, the disclosure of which is incorporated herein by reference.

BACKGROUND OF THE INVENTION

The present invention relates to a positive electrode active material for a non-aqueous electrolyte battery and a production method thereof. The present invention further relates to a high-capacity and low-cost non-aqueous electrolyte secondary battery having a positive electrode containing a specific positive electrode active material.

In recent years, with the widespread use of cordless and portable AV appliances, personal computers and the like, the need has been increasing for compact, light weight, and high energy density batteries as power sources for driving those appliances. In particular, lithium secondary batteries, as having high energy density, are expected to be dominant batteries in the next generation, and the potential market thereof is very large.

In most of the lithium secondary batteries currently available on the market, $LiCoO_2$ having a high voltage of 4 V is used as the positive electrode active material, but $LiCoO_2$ is costly because Co is expensive. Under such circumstances, research has been progressing to investigate various positive electrode active materials as substitutes for $LiCoO_2$. Among them, a lithium-containing transition metal oxide has been wholeheartedly researched: $LiNi_aCo_bO_2$ (a+b=1) is promising, and it seems that $LiMn_2O_4$ having a spinel structure has already been commercialized.

In addition, nickel and manganese as substitute materials for expensive cobalt have also been under vigorous research. $LiNiO_2$ having a layered structure, for example, is expected to have a large discharge capacity, but the crystal structure of $LiNiO_2$ changes during charging/discharging, causing a great deal of deterioration thereof. In view of this, it is proposed to add to $LiNiO_2$ an element that can stabilize the crystal structure during charging/discharging and thus prevent the deterioration. As the additional element, specifically, there are exemplified cobalt, manganese, titanium and aluminum.

Moreover, prior art examples which use composite oxides of Ni and Mn as the positive electrode active material for lithium secondary batteries will be described: U.S. Pat. No. 5,393,622, for example, proposes a method in which a hydroxide of Ni, a hydroxide of Mn and a hydroxide of Li are dry-mixed together and baked and, after cooling them down to room temperature, the mixture is again heated and baked to obtain an active material having a composition represented by the formula $Li_yNi_{1-x}Mn_xO_2$ wherein $0 \leq x \leq 0.3$, $0 \leq y \leq 1.3$.

Further, U.S. Pat. No. 5,370,948 proposes a method in which a Li salt, a Ni salt and a Mn salt are mixed together into an aqueous solution, followed by drying and baking, to obtain an active material represented by the formula $LiNi_{1-x}Mn_xO_2$ wherein $0.005 \leq x \leq 0.45$.

Further, U.S. Pat. No. 5,264,201 proposes a dry synthesis method in which hydroxides or oxides of nickel and manganese and an excess amount of lithium hydroxide are mixed together and baked, and a synthesis method in which an oxides of nickel and manganese or the like are added to a saturated aqueous solution of lithium hydroxide to form a slurry, which is then dried and baked under a reduced pressure, to obtain an active material represented by the formula $Li_xNi_{2-x-y}Mn_yO_2$ wherein $0.8 \leq x \leq 1.0$, $y \leq 0.2$.

Furthermore, U.S. Pat. No. 5,629,110 proposes a dry mixing synthesis method which uses $\beta$-$Ni(OH)_2$ to obtain an active material represented by the formula $LiNi_{1-x}Mn_xO_2$ wherein $0 < x \leq 0.2$, $y \leq 0.2$.

Japanese Laid-Open Patent Publication No. Hei 8-171910 proposes a method in which manganese and nickel are coprecipitated by adding an alkaline solution into an aqueous solution mixture of manganese and nickel, then lithium hydroxide is added and the resulting mixture is baked, to obtain an active material represented by the formula

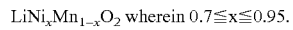

$LiNi_xMn_{1-x}O_2$ wherein $0.7 \leq x \leq 0.95$.

Further, Japanese Laid-Open Patent Publication No. Hei 9-129230 discloses a preferable particulate active material having a composition represented by the formula $LiNi_xM_{1-x}O_2$ wherein M is at least one of Co, Mn, Cr, Fe, V and Al, $1 > x \geq 0.5$, and shows a material with $x=0.15$ as the active material containing Ni and Mn.

Further, Japanese Laid-Open Patent Publication No. Hei 10-69910 proposes an active material synthesized by a coprecipitation synthesis method, represented by the formula $Li_{y-x1}Ni_{1-x2}M_xO_2$ wherein M is Co, Al, Fe, Mg or Mn, $0 < x_2 \leq 0.5$, $0 \leq x_1 < 0.2$, $x = x_1 + x_2$, and $0.9 \leq y \leq 1.3$. This patent publication describes that the discharge capacity is inherently small if M is Mn, and the essential function of the positive electrode active material for a lithium secondary battery intended to achieve a high capacity is dismissed if $x_2$ is more than 0.5. $LiNi_{0.6}Mn_{0.4}O_2$ is exemplified as a material having the highest proportion of Mn.

It should be noted that, although U.S. Pat. No. 5,985,237 shows a production method of $LiMnO_2$ having a layered structure, this is practically a 3 V level active material.

All of the prior art examples disclosed in the above U.S. patents and Japanese Laid-Open Patent Publications are intended to improve the electrochemical characteristics such as the cycle characteristic of $LiNiO_2$ by adding a trace amount of an element to $LiNiO_2$, while retaining the characteristic properties of $LiNiO_2$. Accordingly, in the active material obtained after the addition, the amount of Ni is always larger than that of Mn, and the preferable proportion is considered to be Ni:Mn=0.8:0.2. As an example of a material having a proportion with a highest amount of Mn, Ni:Mn=0.55:0.45 is disclosed.

However, in any of these prior art examples, it is difficult to obtain a composite oxide having a single-phase crystal structure since $LiNiO_2$ is separated from $LiMnO_2$. This is because $Mn^{2+}$ tends to be oxidized and becomes $Mn^{3+}$ during coprecipitation, and $Mn^{3+}$ is difficult to form a homogenous composite oxide with $Ni^{2+}$.

As described above, as a substitute material for the currently commercialized $LiCoO_2$ having a high voltage of 4 V, $LiNiO_2$ and $LiMnO_2$ as high-capacity and low-cost positive electrode active materials having a layered structure like $LiCoO_2$ have been researched and developed.

However, the discharge curve of $LiNiO_2$ is not flat, and the cycle life is short. In addition, the heat resistance is low, and hence the use of this material as the substitute material for $LiCoO_2$ would involve a serious problem. In view of this, improvements have been attempted by adding various elements to $LiNiO_2$, but satisfactory results have not been obtained yet. Further, since a voltage of only 3 V can be obtained with $LiMnO_2$, low-capacity $LiMn_2O_4$ which does not have a layered structure but has a spinel structure is beginning to be researched.

Namely, required has been a positive electrode active material which has a voltage of 4V, as high as $LiCoO_2$, exhibits a flat discharge carve, and whose capacity is higher and cost is lower than $LiCoO_2$; further required has been a high-capacity non-aqueous electrolyte secondary battery with excellent charge/discharge efficiency, which uses the above positive electrode active material.

As opposed to this, Japanese Laid-Open Patent Application No. 2000-227858 does not propose a technique for improving the inherent characteristics of $LiNiO_2$ or those of $LiMnO_2$ by adding a new element thereto, but proposes a positive electrode active material comprising a nickel manganese composite oxide which represents a new function by dispersing a nickel compound and a manganese compound uniformly at the atomic level to form a solid solution.

That is to say, the prior art examples propose plenty of additional elements, but do not technically clarify which elements are specifically preferred, whereas the above application proposes the positive electrode active material which can represent a new function by combining nickel and manganese at about the same ratio.

Based on the fact that it is possible to obtain a nickel manganese composite oxide which represents a new function by dispersing nickel and manganese uniformly at the atomic level to form a solid solution, the present inventors conducted extensive studies on an oxide containing a variety of transition metals, the composition and the crystal structures thereof (the description of Japanese Laid-Open Patent Application No. 2001-195353).

On the back of this, the present inventors found that a synthesis method of a composite oxide mainly composed of nickel and manganese exerts a significant influence on the characteristics of the oxide as the active material, clarified important factors for synthesizing an optimum active material and at the same time found a concrete means, to accomplish the present invention.

BRIEF SUMMARY OF THE INVENTION

The present invention relates to a positive electrode active material produced with the use of a dry precursor obtained by: introducing an alkaline solution together with an aqueous solution containing two or more of transition metal salts or two kinds or more of aqueous solutions of different transition metal salts into a reaction vessel to obtain a hydroxide or an oxide as a precursor through coprecipitation with a reductant being coexistent or an inert gas being supplied; and drying the precursor at 300 to 500° C. to obtain a dry precursor.

It is effective that the lithium-containing transition metal oxide is represented by Formula (1):

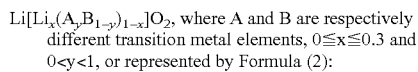
where A and B are respectively different transition metal elements, $0 \leq x \leq 0.3$ and $0 < y < 1$, or represented by Formula (2):

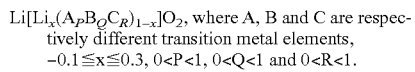
where A, B and C are respectively different transition metal elements, $-0.1 \leq x \leq 0.3$, $0 < P < 1$, $0 < Q < 1$ and $0 < R < 1$.

It is effective that A and B above are nickel and manganese, respectively.

It is also effective that a different kind of element is doped into the surface of a crystal particle of the oxide. In this case, it is effective that the different kind of element is at least one selected from the group consisting of aluminum, magnesium, calcium, strontium, yttrium and ytterbium.

It is further effective that a proportion of the different kind of element to the total of the transition metal elements is from 0.05 to 20 mol %.

The present invention further relates to a production method of a positive electrode active material for a non-aqueous electrolyte battery, comprising the steps of: introducing an alkaline solution together with an aqueous solution containing two or more of transition metal salts or two kinds or more of aqueous solutions of different transition metal salts into a reaction vessel to obtain a hydroxide or an oxide as a precursor through coprecipitation with a reductant being coexistent or an inert gas being supplied; drying the precursor at 300 to 500° C. to obtain a dry precursor; and baking a mixture of the dry precursor and a lithium compound to obtain a lithium-containing transition metal oxide.

It is effective that the mixture of the dry precursor and the lithium compound is baked at a temperature of 900° C. or higher.

It is effective that the production method further comprises a step of doping a different kind of element into the surface of a crystal particle of the lithium-containing transition metal oxide.

The present invention further relates to a non-aqueous electrolyte secondary battery comprising: a negative electrode containing, as a negative electrode active material, a material capable of absorbing and desorbing at least lithium ions and/or metal lithium; a separator; a positive electrode containing the positive electrode active material as previously described; and an electrolyte.

According to the present invention, a high-capacity non-aqueous electrolyte secondary battery with excellent charge/discharge efficiency can be fabricated without a variation.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1 is a diagram representing X-ray diffraction patterns of a precursor in accordance with Comparative Example and a dry precursor obtained by heating and drying the precursor.

DETAILED DESCRIPTION OF THE INVENTION

Figure 2:
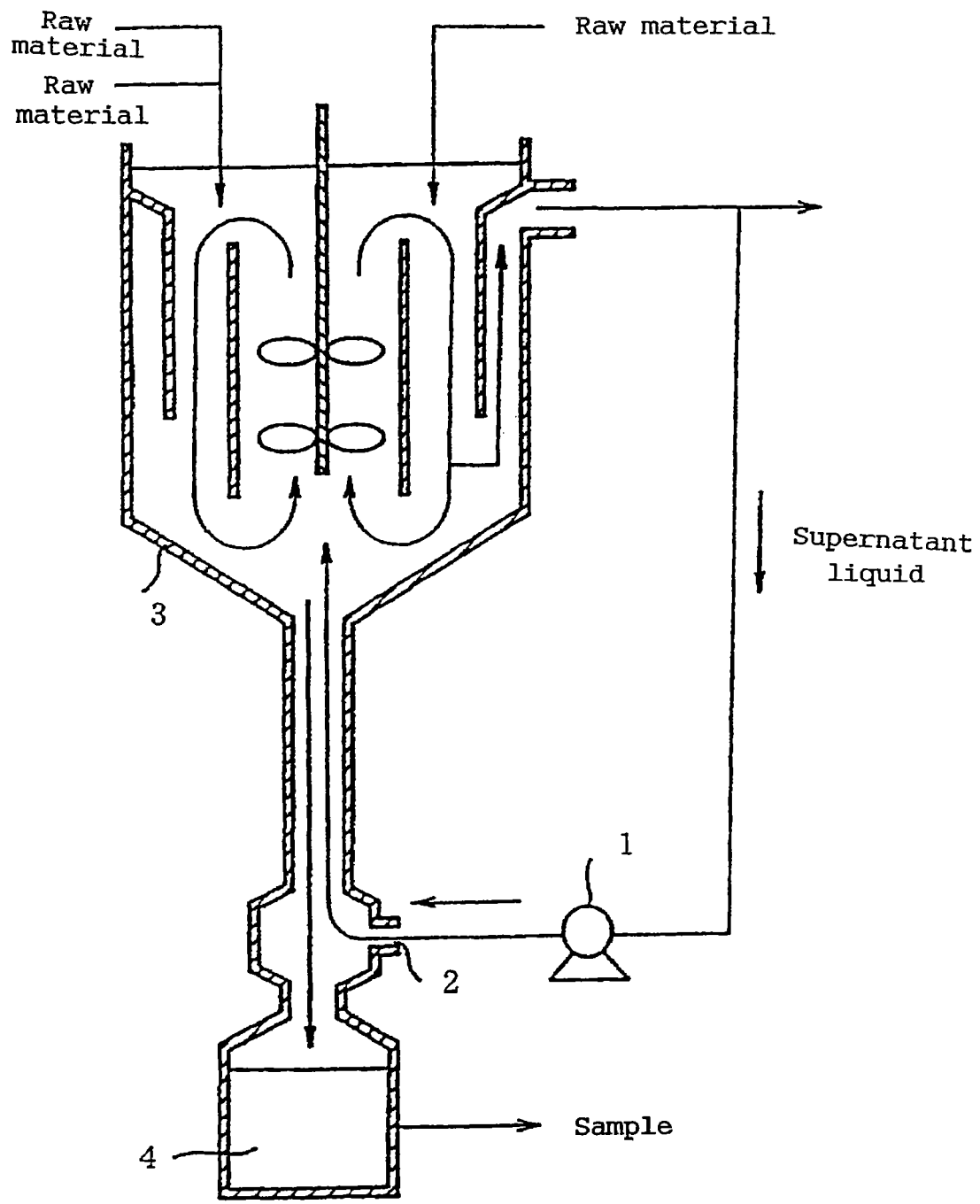
FIG. 2 is a schematic vertical sectional view representing equipment for use in production of positive electrode active materials in Example and Comparative Example of the present invention.

Based on the findings that it is of importance that two transition metals form a solid solution at the atomic level and those two transition metals are substantially much the same in number in a positive electrode active material to be obtained and that the positive electrode active material has a layered crystal structure where oxygens form a cubic closest packing, and further, as a result of their extensive studies on the state of a hydroxide or an oxide of two or more of transition metals as intermediate products in synthesizing the materials, the present inventors have found that the state of the hydroxide or oxide is important for synthesis of a material having a higher capacity with more stability, to accomplish the present invention.

Conventionally, there have been some cases where performances of actually-produced positive electrode active materials and batteries with the use thereof subtly differ depending on production lots even when the positive electrode active materials are produced under the same conditions. As opposed to this, when a positive electrode active material composed of a lithium-containing transition metal oxide is synthesized by the use of a dry precursor obtained by drying a hydroxide or an oxide as a precursor at 300 to 500° C., there is observed a smaller variation in capacity of the obtained battery, and a positive electrode active material having a lower capacity degradation ratio can be obtained regardless of the production lots.

An X-ray diffraction pattern (ii) for a precursor and an x-ray diffraction pattern (i) for a dry precursor obtained by heating, dehydrating and drying the precursor at 400° C. were shown in FIG. 1. There can further be reduction in variation when this dry precursor is used for synthesizing a positive electrode active material composed of a lithium-containing transition metal oxide.

The production method of the positive electrode active material in accordance with the present invention comprises: a step (a) of introducing an alkaline solution together with an aqueous solution containing two or more of transition metal salts or two kinds or more of aqueous solutions of different transition metal salts into a reaction vessel to obtain a hydroxide or an oxide as a precursor through coprecipitation with a reductant being coexistent or an inert gas being supplied; a step (b) of drying the precursor at 300 to 500° C. to obtain a dry precursor; and a step (c) of baking a mixture of the dry precursor and a lithium compound to obtain a lithium-containing transition metal oxide.

First, a hydroxide or an oxide containing two or more of transition metals are prepared by conducting the coprecipitation step (a) in the same manner as conventionally done.

For example, Japanese Laid-Open Patent Publication No. Hei 8-171910 discloses a nickel manganese coprecipitation method. Further, Japanese Laid-Open Patent Application No. 2000-227858 describes this method in more detail. The coprecipitaion method is a method for obtaining a composite oxide by simultaneously precipitating mainly two elements in an aqueous solution by the use of neutralization reaction. Taking the cases of nickel, cobalt and manganese for example, because manganese is oxidized very easily, manganese is oxidized enough to be converted into the trivalent state even with a trace amount of oxygen dissolved in the aqueous solution, leading to an insufficient solid solution formation at the atomic level.

When the hydroxide is obtained by coprecipitation, $Mn_2O_3$ may also be generated, while the crystallinity thereof is low after drying. In order to prevent such situations as above, the methods taken in the present invention are a method in which the dissolved oxygen is removed by bubbling an inert gas such as nitrogen or argon in the aqueous solution, a method in which a reductant such as hydrazine is added into the aqueous solution in advance, and the like. Further, oxidation may be suppressed by settling the piping of the equipment and carrying out the purge with an inert gas to prevent oxygen from being mixed in during stirring.

In order to obtain a spherical hydroxide or oxide having a dense and large particle size in the step (a), it is preferable that the following operations are conducted with the use of equipment shown in FIG. 2.

FIG. 2 shows an embodiment of the equipment which can be used for the production method of the positive electrode active material of the present invention.

First, an alkaline solution together with an aqueous solution containing two or more of transition metal salts or two kinds or more of aqueous solutions of different transition metal salts are charged into a reaction vessel 3 through the upper part thereof. The mixture of these aqueous solutions are introduced into the reaction vessel 3 also through a supply port 2 by using a pump 1, which is then flowed upward from the bottom of the reaction vessel 3 to collide with the coprecipitating microcrystals falling downward. Only a clear supernatant liquid can be introduced through the supply port 2. A collector 4 for collecting the obtained hydroxide or oxide is provided in the lower part of the equipment.

In this system, therefore, a crystalline particle grown to a certain degree and thus having an increased specific gravity falls downward to reach the collector 4 in the lower part, but a crystalline particle not grown enough is pushed back upward by the force of the solution flowed from the lower part and is hence prevented from falling downward. With this method, a hydroxide or an oxide with a large particle size of from 10 to 20 μm and a high tap density of about 2.2 g/cm³ can be obtained.

Although it is possible to use a variety of elements as the transition elements, in accordance with a composition of a positive electrode active material to be obtained, at least two elements selected from the group consisting of cobalt, nickel, manganese and iron are preferably used from the viewpoint of obtaining a positive electrode active material for a high-capacity lithium secondary battery of 4 V level.

Accordingly, as for the aqueous solution containing two or more of transition metal salts or two kinds or more of aqueous solutions of different transition metal salts, a nickel sulfate aqueous solution, a manganese sulfate aqueous solution, a cobalt sulfate aqueous solution, and a mixed solution of those aqueous solutions can be used, for example.

Any skilled person can appropriately control concentrations of those aqueous solutions according to the composition of the positive electrode active material to be obtained, and the concentrations may be, for example, from 1 to 5 mol/l. As for the alkaline aqueous solution, an NaOH aqueous solution, a NH$_3$ solution or the like can be used, for example. The concentrations of those aqueous solutions may be, for example, from 1 to 9 mol/l. However, the concentrations can be changed depending on the rate of the dropwise addition, size of the reaction vessel and the like, and it is thus possible for any skilled person to optimize them in the broad range.

Next, a dry precursor, which is the prime characteristic of the present invention, is obtained by heating to bake and drying the hydroxide or oxide as the precursor obtained in the step (a).

The heating temperature here is preferably from 300 to 500° C. because at these temperatures, dehydration of contained water by heating is nearly completed and then the gravity becomes constant. When the temperature is higher than 500° C., crystallinity of the precursor increases too much, causing a decrease in reactivity with lithium, which is not desirable. Although the heating time is affected by a filled amount of a powdered precursor to be dried, and the like, it may be from 1 to 10 hours for completing dehydration.

Conventionally, the hydroxide or oxide as the precursor obtained in the step (a) is mixed as it is with a lithium compound, and the resulting mixture is baked to produce a positive electrode active material composed of a lithium-containing transition metal oxide (a composite oxide). As opposed to this, the present inventors have found that a preferable positive electrode active material can be obtained by the use of a dry precursor having the X-ray diffraction pattern as shown with (i) in FIG. 1, which is obtained by suppressing oxidation of Mn to the utmost with the methods as thus described in preparation of the hydroxide or oxide as the precursor and heating the precursor at 300 to 500° C.

Subsequently, in the step (c), the mixture obtained by mixing the dry precursor and a lithium compound is baked.

As the lithium compound to be mixed, lithium carbonate and/or lithium hydroxide are preferably employed. In particular, lithium hydroxide is more preferably used. With lithium carbonate used, it is still possible to obtain a positive electrode active material composed of a single-phase lithium-containing transition metal oxide, which is the object of the present invention; however, it is more advantageous to use lithium hydroxide from the perspectives of control on the particle shape and crystallinity.

The reason for this is that, with the use of lithium hydroxide, lithium hydroxide melts at a relatively law temperature, lithium is fed even to the inside of a particle of a nickel manganese hydroxide or oxide, and gradual oxidation reaction occurs in an inward direction from the outside of the particles as the temperature rises.

When lithium carbonate is used, on the other hand, decarboxylation reaction, which is to occur once, occurs at a higher temperature than in the case of lithium hydroxide, undesirably causing decarboxylation reaction and oxidation reaction to occur almost simultaneously.

For example, a nickel manganese cobalt hydroxide or oxide and lithium hydroxide are thoroughly mixed together in a dry system. Lithium hydroxide and the nickel manganese cobalt composite oxide may be mixed in accordance with the composition of the positive electrode active material to be obtained, and it is ideal that they are mixed so that the atomic ratio of Li, Ni, Mn and Co satisfies Li/(Ni+Mn+Co)=1.

However, the ratio may be slightly increased or decreased in order to control the baking temperature and the particle shape. For example, when the baking temperature is high, or when the primary particle size after baking is to be increased, a somewhat increased amount of lithium is mixed. In this case, the increase or decrease of about 3% is preferred.

The mixture of the dry precursor and the lithium compound may be baked in an oxidizing atmosphere. An ordinary air atmosphere may thus be applied.

It is preferable that baking is conducted at a temperature of from 900 to 1200° C. on the grounds that the mixture of lithium hydroxide with the hydroxide or oxide obtained by coprecipitation in the dry system and simultaneous oxidation reactions of preferable elements such as cobalt, manganese and nickel make it easier to obtain a uniform composite oxide.

Further, an aneal step can be conducted after the baking for the purpose of preventing an oxygen loss of the lithium-containing transition metal oxide to be obtained.

It is effective that the crystal particle of the lithium-containing transition metal oxide constituting the positive electrode active material of the present invention as thus obtained is represented by Formula (1):

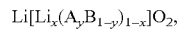

where A and B are respectively different transition metal elements, $0 \leq x \leq 0.3$ and $0 < y < 1$, or Formula (2):

where A, B and C are respectively different transition metal elements, $-0.1 \leq x \leq 0.3$, $0 < P < 1$, $0 < Q < 1$ and $0 < R < 1$.

It should be noted that, while the positive electrode active material in accordance with the present invention substantially comprises such transition metals as nickel, manganese and cobalt, it can easily be expected that addition of a different kind of element (an additional element or a dopant) can give an additional value.

The positive electrode active material of the present invention may therefore comprise such a different kind of element other than those described above. Particularly, since the crystal particle of the positive electrode active material composed of the lithium-containing transition metal oxide is granular, it is practical to make such an additional element included in the vicinity of the surface of the crystal particle. The present invention includes any of positive electrode active materials having an additional function due to the additional element.

The examples of the different kind of element may include aluminum, magnesium, calcium, strontium, yttrium and ytterbium.

The electric potential of the positive electrode active material is somewhat increased and thermal stability is improved simultaneously by doping aluminum. In this case, when the precursor obtained in the aforesaid steps (a) and (b) is mixed with lithium hydroxide to be baked, an appropriate amount of an aluminum source such as aluminum hydroxide is mixed at the same time. Thereby, aluminum is not uniformly doped into the oxide particle including the inside thereof, which is obtained through a eutectic reaction; the concentration of aluminum doped only into the vicinity of the surface of the crystal particle becomes higher than those of aluminum doped into other areas in the particle.

This can be confirmed by a characteristic X-ray diffraction analysis of the crystal particle, or the like. With doping, therefore, a main body of the crystal particle constituting the positive electrode active material can retain the effect of the crystal structure of the transition metal element, and the aforesaid effect can be added because only the state of the surface of the crystal particle changes.

It is to be noted that, since the effect of the crystal structure is decreased with increase in added amount of aluminum or the like, it is effective to distribute aluminum or the like somewhat unevenly to the surface of the crystal particle. Strontium, yttrium and the like can also impart an effect of improving heat resistance.

Further, addition of magnesium allows the electronic conductivity of the positive electrode active material to be one order or two of magnitude greater. In this case alike, magnesium hydroxide may be mixed with the precursor and lithium hydroxide to be baked. Baking may also be conducted in the aforesaid manner. When the positive electrode active material as thus obtained is used for a battery, it is expected that extremely high electronic conductivity of the battery makes it possible to decrease an amount of a conductive agent so as to increase the battery capacity.

It is effective that each of the added amounts of those different kinds of elements is within the range of 0.05 to 20 atom % to the total amount of the aforesaid transition metals. With the added amounts out of this range, problems may arise: when it is less than 0.05 atom %, a sufficient effect cannot be obtained; when it is more than 20 atom %, the capacity decreases.

In the following, a description will be given of other constituent materials that can be used when fabricating a non-aqueous (lithium) secondary battery using the positive electrode of the present invention.

The electrically conductive material used in the positive electrode mixture for the production of the positive electrode of the present invention is not limited to a particular material, but any electronically conductive material can be used as long as the material does not cause any chemical change in the fabricated battery. Examples include: graphites such as natural graphite (scale graphite and the like) and artificial graphite; carbon blacks such as acetylene black, Ketjen black, channel black, furnace black, lamp black and thermal black; electrically conductive fibers such as carbon fiber and metallic fiber; metallic powders such as carbon fluoride powder, copper powder, nickel powder, aluminum powder and silver powder; electrically conductive whiskers such as zinc oxide whisker and potassium titanate whisker; electrically conductive metal oxides such as titanium oxide; and electrically conductive organic materials such as polyphenylene derivatives. These materials can be used alone or in any combination thereof within the scope that does not impair the effect of the present invention.

Among them, artificial graphite, acetylene black and nickel powder are particularly preferable. The amount of the electrically conductive material to be added is not particularly specified, but from 1 to 50% by weight is preferably, and from 1 to 30% by weight is particularly preferable. In the case of carbon and graphite, from 2 to 15% by weight is particularly preferable.

For the binder used in the positive electrode mixture of the present invention, a polymer having a decomposition temperature of 300° C. or higher is preferable. Examples include polyethylene, polypropylene, polytetrafluoroethylene (PTFE), polyvinylidene fluoride (PVDF), tetrafluoroethylene-hexafluoroethylene copolymer, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, and vinylidene fluoride-perfluoromethyl vinyl ether-tetrafluoroethylene copolymer. These materials can be used alone or in any combination thereof within the scope that does not impair the effect of the present invention.

Among them, polyvinylidene fluoride (PVDF) and polytetrafluoroethylene (PTFE) are most preferable.

The material, which constitutes the current collector for the positive electrode is not limited to a particular material, but any electronically conductive material can be used as long as the material does not cause any chemical change in the fabricated battery. The current collector may comprise, for example, stainless steel, nickel, aluminum, titanium, various alloys or carbons, or a composite material such as aluminum or stainless steel with the surface thereof treated with carbon, nickel, titanium or silver.

Among them, aluminum or an aluminum alloy is preferable. The surface of these materials may be treated with oxidization. Also, the surface of the collector may be roughened by surface treatment. As for the current collector shape, any shape commonly employed in the field of batteries can be used. Examples of the shape include a foil, a film, a sheet and a net, a punched sheet, a lath body, a porous body, a foamed body, fibers and a non-woven fabric. The thickness is not particularly specified, but the thickness of from 1 to 500 µm is preferable.

The negative electrode active material used in the present invention can comprise a compound, which can absorb and desorb a lithium ion, such as lithium, alloys such as lithium alloys, intermetallic compounds, carbon, organic compounds, inorganic compounds, metal complexes and organic polymer compounds. These materials can be used alone or in any combination thereof within the scope that does not impair the effect of the present invention.

As the lithium alloys, there are exemplified Li—Al based alloys, Li—Al—Mn based alloys, Li—Al—Mg based alloys, Li—Al—Sn based alloys, Li—Al—In based alloys, Li—Al—Cd based alloys, Li—Al—Te based alloys, Li—Ga based alloys, Li—Cd based alloys, Li—In based alloys, Li—Pb based alloys, Li—Bi based alloys, Li—Mg based alloys and the like. In this case, the lithium content is preferably 10% by weight or higher.

As the alloy and intermetallic compounds, there are compounds of a transition metal and silicon, compounds of a transition metal and tin and the like. A compound of nickel and silicon is preferable.

As the carbonaceous materials, there are coke, pyrolytic carbon, natural graphite, artificial graphite, mesocarbon microbeads, graphite mesophase particles, gas phase grown carbon, vitrified carbons, carbon fiber (polyacrylonitrile type, pitch type, cellulose type and gas phase grown carbon), amorphous carbon and carbons obtained by baking organic materials. These materials can be used alone or in any combination thereof within the scope that does not impair the effect of the present invention. Among them, graphite materials such as graphite mesophase particles, natural graphite, and artificial graphite are preferable.

It is to be noted that the carbonaceous material may contain, in addition to carbon, such dissimilar compounds as O, B, P, N, S, SiC and B4C. The content of such material is preferably from 0 to 10% by weight.

As the inorganic compounds, there are tin compounds and silicon compounds for example, and as the inorganic oxides, there are titanium oxide, tungsten oxide, molybdenum oxide, niobium oxide, vanadium oxide and iron oxide for example.

As the inorganic chalcogenides, there are, for example, iron sulfide, molybdenum sulfide and titanium sulfide.

As the organic polymer compounds, there are, for example, polymer compounds such as polythiophene and polyacetylene. And as the nitride, there are, for example, cobalt nitride, copper nitride, nickel nitride, iron nitride and manganese nitride.

These negative electrode materials may be used in combination; for example, a combination of carbon and an alloy and a combination of carbon and an inorganic compound are possible.

The average particle size of the carbon material used in the present invention is preferably from 0.1 to 60 μm, and more preferably from 0.5 to 30 μm. The specific surface is preferably from 1 to 10 m$^2$/g. In terms of the crystal structure, graphite having a hexagonal lattice spacing (d002) of carbon is from 3.35 to 3.40 Å and a size (LC) of the crystalline in the c-axis direction of 100 Å or larger, is preferable.

In the present invention, since the positive electrode active material comprises Li, a negative electrode material (carbon or the like) that does not comprise Li can be used. However, it is preferable to add a small amount of Li (about 0.01 to 10 parts by weight per 100 parts by weight of the negative electrode material) into such a negative electrode material with no Li, because if part of Li atoms becomes inactive by reacting with the electrolyte, for example, it can be supplemented with the Li added in the negative electrode material.

To add Li into the negative electrode material as thus described, Li is impregnated into the negative electrode material by applying a heated and melted lithium metal onto the current collector to which the negative electrode material is pressed and adhered, or Li is electrochemically doped into the negative electrode by attaching a lithium metal in advance into an electrode group by pressing and adhering or other means and immersing the whole into an electrolyte solution.

The electrically conductive material used in the negative electrode mixture is not limited to a particular material but, as in the case of the electrically conductive material used in the positive electrode mixture, any electronically conductive material can be used as long as the material does not cause any chemical change in the fabricated battery. If the carbonaceous material is used for the negative electrode, the electrically conductive material need not necessarily be added because the carbonaceous material itself has electronic conductivity.

For the binder used in the negative electrode mixture, either a thermoplastic resin or a thermosetting resin can be used, but a polymer having a decomposition temperature of 300° C. or higher is preferable.

Examples for the binging agent include polyethylene, polypropylene, polytetrafluoroethylene (PTFE), polyvinylidene fluoride (PVDF), styrene-butadiene rubber, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer and vinylidene fluoride-perfluoromethyl vinyl ether-tetrafluoroethylene copolymer. Among them, styrene-butadiene rubber and polyvinylidene fluoride are preferably used, and styrene-butadiene rubber is most preferably used.

The material of the current collector for the negative electrode is not limited to a particular material, but any electronically conductive material can be used as long as the material does not cause any chemical change in the fabricated battery. As the material constituting the current collector, there are, for example, stainless steel, nickel, copper, titanium, carbon, a material such as copper or stainless steel with the surface treated with carbon, nickel, titanium or silver, or an Al—Cd alloy. Among them, copper or a copper alloy is preferable. The surface of these materials may be treated with oxidization. Also, the surface of the collector may be roughened to form convex and concave by surface treatment.

As for the current collector shape, a foil, a film, a sheet, a net, a punched sheet, a lath body, a porous body, a foamed body, or fiber molding can be used, as in the case for the above positive electrode. The thickness is not particularly specified, but the thickness between 1 μm and 500 μm is preferable.

In addition to the electrically conductive material and the binder, a filler, a dispersing agent, an ion conducting material, a pressure reinforcing agent, and other various additives may be added in the electrode mixture. Any fibrous material can be used for the filler as long as it does not cause any chemical change in the fabricated battery. Usually, a fiber comprising an olefin polymer fiber such as polypropylene or polyethylene, a glass fiber or a carbon fiber is used. The amount of the filler to be added is not particularly specified, but from 0 to 30% by weight is preferable.

The positive electrode and negative electrode used in the present invention may each have, in addition to the mixture layer containing the positive electrode active material or negative electrode material, other layers such as a base coat layer intended, for example, to improve the adhesion between the collector and the mixture layer, the electrical conductivity, the cycle characteristics, and the charge/discharge efficiency, and a protective layer intended for mechanical and chemical protection of the mixture layer. The base coat layer and the protective layer may contain a binder or electrically conductive agent particles or electrically non-conductive particles.

An insulating microporous thin film having a large ion permeability and a specified mechanical strength may be used as the separator. Preferably, the film has the function of closing the pores and increasing the resistance at a temperature of 80° C. or higher. A sheet or non-woven fabric made of an olefin polymer such as polypropylene or polyethylene alone or in combination thereof, or made of glass fiber is used because of the resistances thereof to an organic solvent and hydrophobicity.

It is desirable that the pore diameter of the separator be made small enough to prevent the active material, the binder, the conductive material and the like separated from the electrode sheet from passing through the separator; for example, a diameter of from 0.1 to 1 μm is desirable. As for the separator thickness, a thickness of from 10 to 300 μm is usually preferable. Porosity is determined in accordance with the electron or ion permeability, the material used, the film thickness and the like, and generally a porosity of from 30 to 80% is desirable. Further, when a flame retardant or nonflammable material such as glass or metal oxide film is used, the safety of the battery is further enhanced.

The non-aqueous electrolyte used in the present invention comprises a solvent and a lithium salt dissolved in the solvent. The preferable solvent is one ester or an ester mixture. Above all, cyclic carbonates, cyclic carboxylic acid esters, non-cyclic carbonates, aliphatic carboxylic acid esters and the like are preferably exemplified. Further, solvent mixtures of cyclic carbonates and non-cyclic carbonates, solvent mixtures of cyclic carboxylic acid esters, and solvent mixtures of cyclic carboxylic acid esters and cyclic carbonates are preferably exemplified.

Other solvents to be used in concrete examples of the aforesaid solvents and in the present invention will be exemplified as follows:

Esters, which may be used as the non-aqueous solvent include, for example, cyclic carbonates such as ethylene carbonate (EC), propylene carbonate (PC), butylene carbonate (BC) and vinylene carbonate (VC), non-cyclic carbonates such as dimethyl carbonate (DMC), diethyl carbonate (DEC), ethyl methyl carbonate (EMC), and dipropyl carbonate (DPC), aliphatic carboxylic acid esters such as methyl formate (MF), methyl acetate (MA), methyl propionate (MP) and ethyl propionate (MA), and cyclic carboxylic acid esters such as γ-butyrolactone (GBL).

For cyclic carbonates, EC, PC, VC and the like are particularly preferable; for cyclic carboxylic acid esters, GBL and the like are particularly preferable; and for non-cyclic carbonates, DMC, DEC, EMC and the like are preferable. Further, aliphatic carboxylates may also be preferably used, if occasion demands. Preferably, the aliphatic carboxylate is contained in an amount of 30% or less, and more preferably 20% or less, of the total weight of the solvent.

The solvent in the electrolyte solution of the present invention may contain known aprotic organic solvents, in addition to the above esters in an amount of 80% or more.

Lithium salts dissolved in these solvents include, for example, $LiClO_4$, $LiBF_4$, $LiPF_6$, $LiAlCl_4$, $LiSbF_6$, $LiSCN$, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, chloroborane lithium, lithium tetraphenyl borate, and imides such as $LiN(CF_3SO_2)(C_2F_5SO_2)$, $LiN(CF_3SO_2)_2$, $LiN(C_2F_5SO_2)_2$ and $LiN(CF_3SO_2)(C_4F_9SO_2)$. These salts can be used in the electrolyte alone or in any combination thereof within the scope that does not impair the effect of the present invention. Among them, it is particularly preferable to add $LiPF_6$.

For the non-aqueous electrolyte used in the present invention, an electrolyte containing at least ethylene carbonate and methyl carbonate, and containing $LiPF_6$ as a lithium salt, is particularly preferable. An electrolyte containing GBL as the main solvent is preferred, and in this case, it is preferable to add an additive such as VC in an amount of several %, and to use a salt mixture of $LiBF_4$ and $LiN(C_2F_5SO_2)_2$ as the lithium salt instead of $LiPF_6$.

The amount of the electrolyte used in the battery is not particularly specified, but a suitable amount should be used according to the amount of the positive electrode and negative electrode materials and the size of the battery. The amount of the lithium salt to be dissolved in the non-aqueous solvent is not particularly specified, but from 0.2 to 2 mol/l is preferable, and from 0.5 to 1.5 mol/l is more preferable.

In use, the electrolyte is normally impregnated or filled into the separator comprising, for example, a porous polymer, glass filter, or non-woven fabric.

To make the electrolyte nonflammable, a halogen-containing solvent such as carbon tetrachloride or chlorotrifluoroethylene may be contained in the electrolyte. Also, carbon dioxide gas may be added in the electrolyte to confer suitability for high temperature storage.

Instead of the liquid electrolyte, a solid electrolyte as described below can also be used. The solid electrolyte is classified to inorganic or organic solid electrolyte.

As the inorganic solid electrolyte, nitrides of Li, halides of Li, and oxysalt of Li are well known. Among them, $Li_4SiO_4$, $Li_4SiO_4$—LiI—LiOH, $xLi_3PO_4$-$(1-x)Li_4SiO_4$, $Li_2SiS_3$, $Li_3PO_4$—$Li_2S$—$SiS_2$ and phosphorus sulfide compounds are effectively used.

As the organic solid electrolyte, on the other hand, there are polymer materials such as polyethylene oxide, polypropylene oxide, polyphosphazone, polyaziridine, polyethylene sulfide, polyvinyl alcohol, polyvinylidene fluoride, polyhexafluoropropylene, and the derivatives, the mixtures and the complexes thereof are effectively used.

It is also possible to use a gel electrolyte formed by impregnating the above non-aqueous liquid electrolyte into the organic solid electrolyte. For the organic solid electrolyte here, polymer matrix materials such as polyethylene oxide, polypropylene oxide, polyphosphazone, polyaziridine, polyethylene sulfide, polyvinyl alcohol, polyvinylidene fluoride, polyhexafluoropropylene, and the derivatives, the mixtures and the complexes thereof, are effectively used. In particular, a copolymer of vinylidene fluoride and hexafluoropropylene and a mixture of polyvinylidene fluoride and polyethylene oxide are preferable.

As for the shape of the battery, any type such as coin type, button type, sheet type, cylindrical type, flat type and rectangular type can be used. In the case of a coin or button battery, the positive electrode active material mixture and negative electrode active material mixture are compressed into the shape of a pellet for use. The thickness and diameter of the pellet should be determined according to the size of the battery.

In the case of a sheet, cylindrical or rectangular type battery, the positive electrode active material mixture and negative electrode active material mixture are usually applied (for coating) onto the current collector, and dried and compressed for use. A well known applying method can be used such as a reverse roll method, direct roll method, blade method, knife method, extrusion method, curtain method, gravure method, bar method, casting method, dip method, and squeeze method. Among them, the blade method, knife method, and extrusion method are preferable.

The application is conducted preferably at a rate of from 0.1 to 100 m/min. By selecting the appropriate applying method according to the solution properties and drying characteristics of the mixture, a applied layer with good surface condition can be obtained. The application to a current collector can be conducted on one side of the current collector, or on the both sides thereof at the same time. Preferably, the applied layers are formed on both sides of the current collector, and the applied layer on one side may be constructed from a plurality of layers including a mixture layer. The mixture layer contains a binder and an electrically conductive material, in addition to the material responsible for the intercalation and releasing of a lithium ion, like the positive electrode and negative electrode active materials. In addition to the mixture layer, a layer containing no active material such as a protective layer, a under coating layer formed on the current collector, and an intermediate layer formed between the mixture layers may be provided. It is preferable that these active-material non-containing layers contain an electrically conductive particle, an insulating particle and a binder.

The application may be performed continuously or intermittently or in such a manner as to form stripes. The thickness, length, and width of the applied layer is determined according to the size of the battery, but preferably, the thickness of the applied layer on each side, after being dried and compressed, is from 1 to 2000 μm.

For drying or dehydration method of the pellet and sheet as the mixture, a commonly employed method can be used. Preferably, heated air, vacuum, infrared radiation, far infrared radiation, electron beam radiation and low humidity air are used alone or in any combination thereof.

The temperature used is preferably within the range of 80 to 350° C., and more preferably 100 to 250° C. The water content of the battery as a whole is preferably held to 2000 ppm or less, and for the positive electrode mixture, negative electrode mixture and electrolyte, it is preferable to hold the water content to 500 ppm or less in view of the cycle characteristics.

For the sheet pressing method, a commonly employed method can be used, but a mold pressing method and calender pressing method are particularly preferable. The pressure for use is not particularly specified, but from 0.2 to 3 t/cm$^2$ is preferable. In the case of the calender pressing method, a press speed is preferably from 0.1 to 50 m/min.

The pressing temperature is preferably between room temperature and 200° C. The ratio of the width of the positive electrode sheet to the width of the negative electrode sheet is preferably at 0.9 to 1.1, and more preferably at 0.95 to 1.0. The ratio of the content of the positive electrode material to the content of the negative electrode material differs according to the kind of the compound used and the formulation of the mixture, but can be set to an optimum value considering the capacity, cycle characteristics and safety.

The wound electrode structure in the present invention need not necessarily be formed in a true cylindrical shape, but may be formed in the shape of an elliptic cylinder whose cross section is an ellipse or in the shape of a rectangular column having a prismatic shape or a rectangular face, for example.

Figure 3:
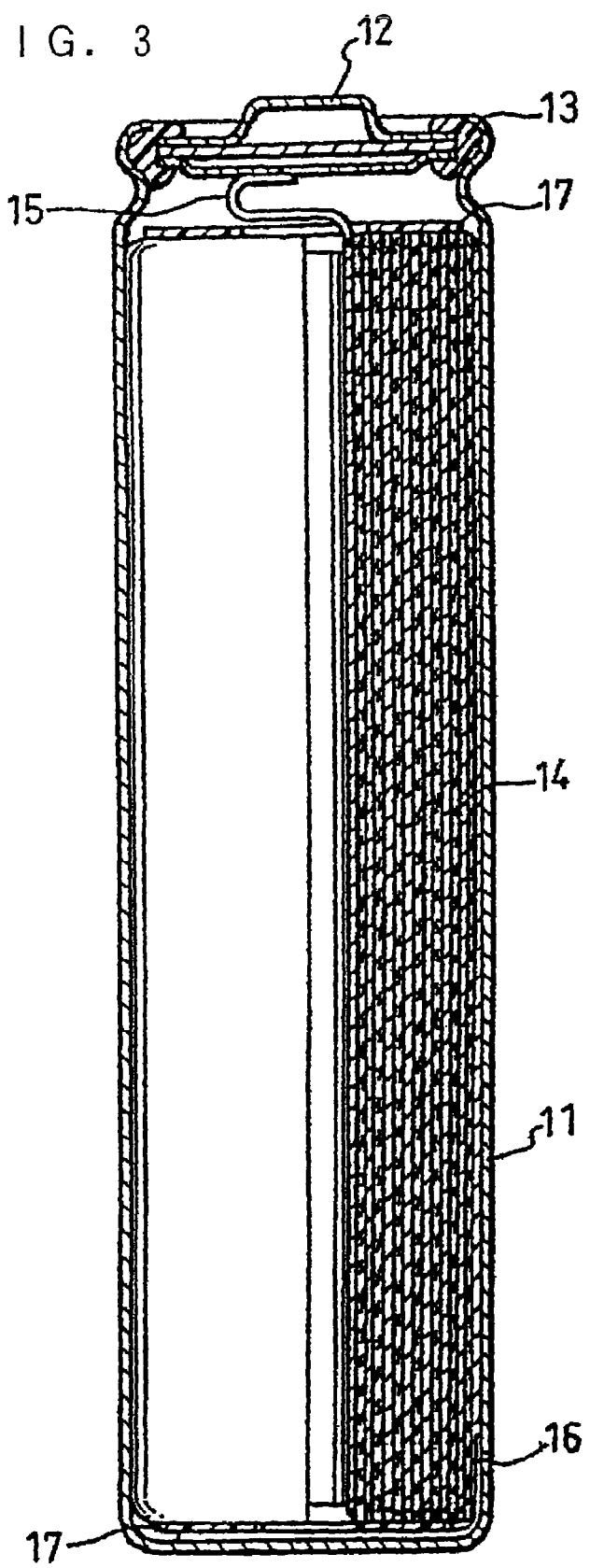
FIG. 3 is a partially schematic vertical sectional view representing a cylindrical battery fabricated in Example or Comparative Example of the present invention.
Figure 4:
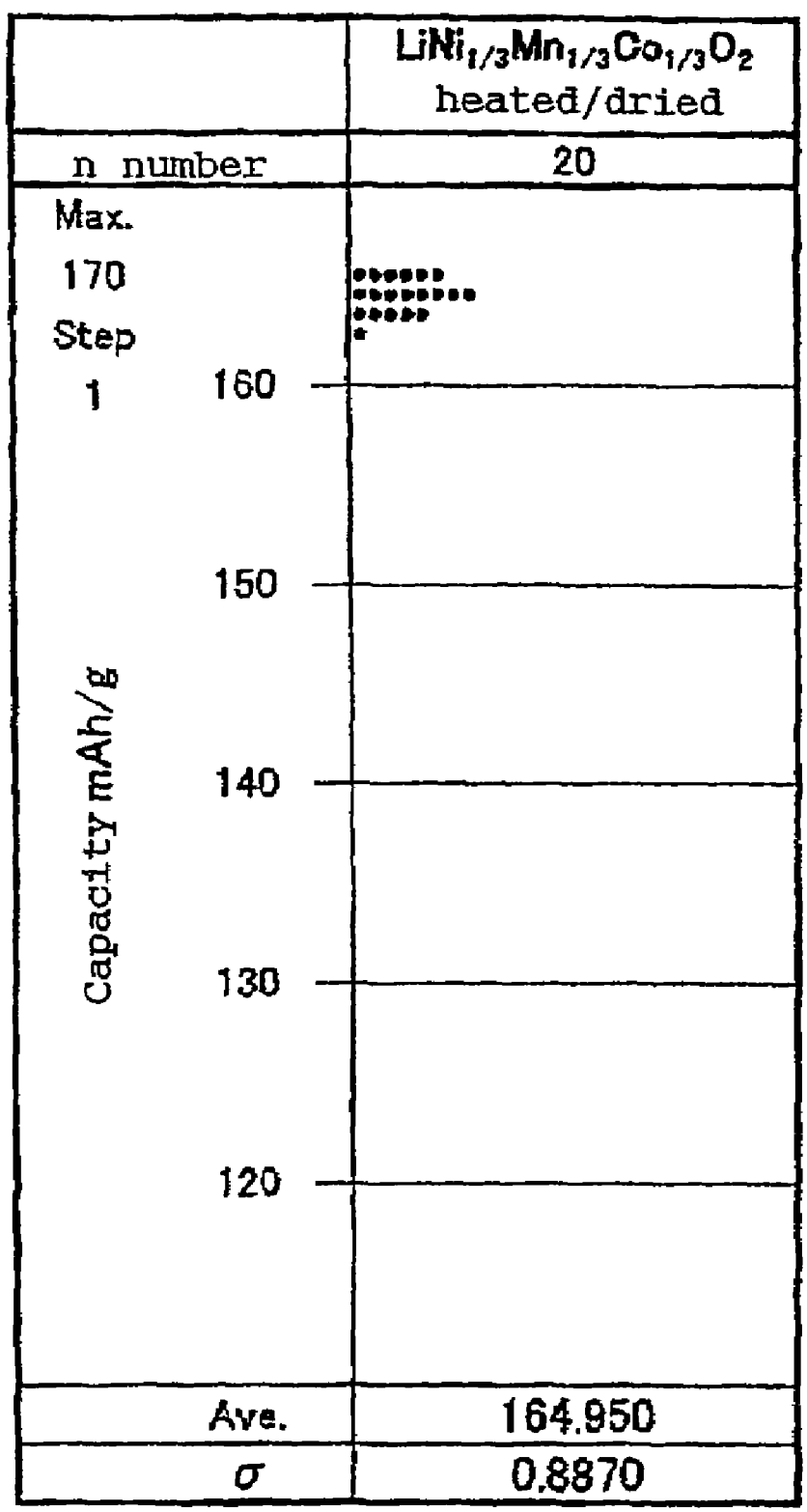
FIG. 4 is a graph showing a variation in discharge capacity of a coin type battery using $LiNi_{1/3}Mn_{1/3}Co_{1/3}O_2$ obtained by the use of the dry precursor in Example of the present invention.
Figure 5:
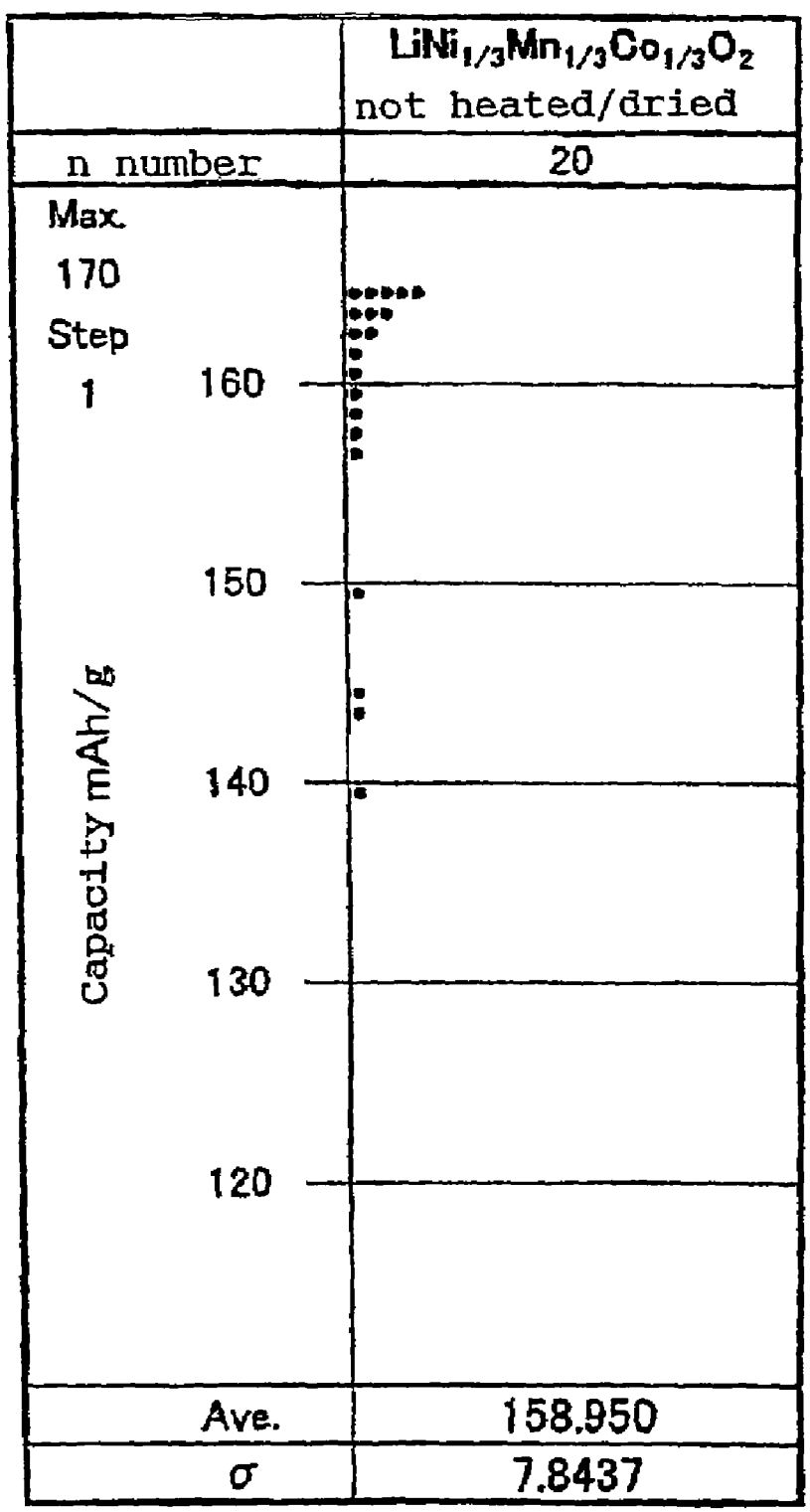
FIG. 5 is a graph showing a variation in discharge capacity of a coin type battery using $LiNi_{1/3}Mn_{1/3}Co_{1/3}O_2$ obtained by the use of the precursor in Comparative Example of the present invention.
Figure 6:
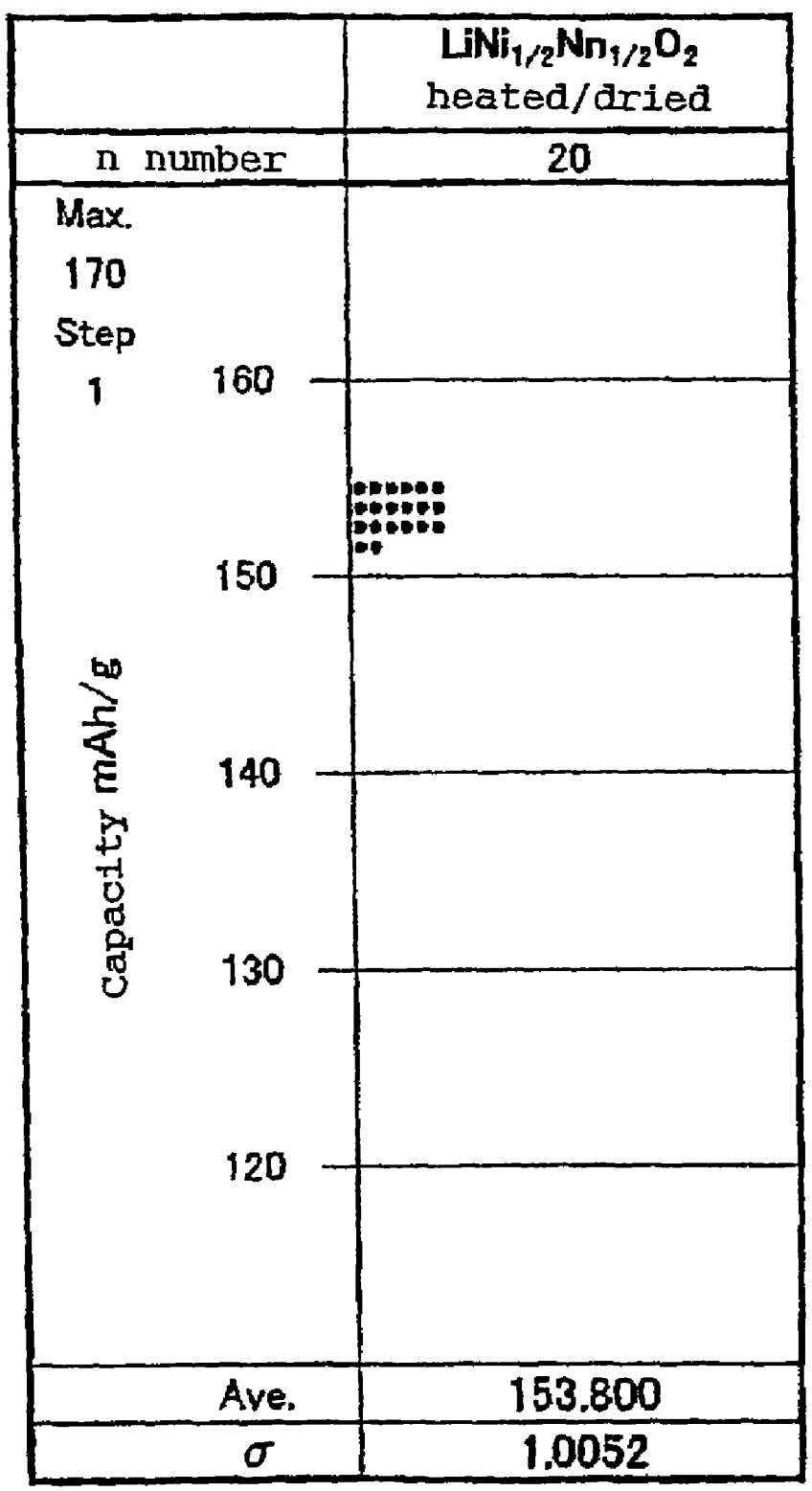
FIG. 6 is a graph showing a variation in discharge capacity of a coin type battery using $LiNi_{1/2}Mn_{1/2}Co_{1/2}O_2$ obtained by the use of the dry precursor in Example of the present invention.
Figure 7:
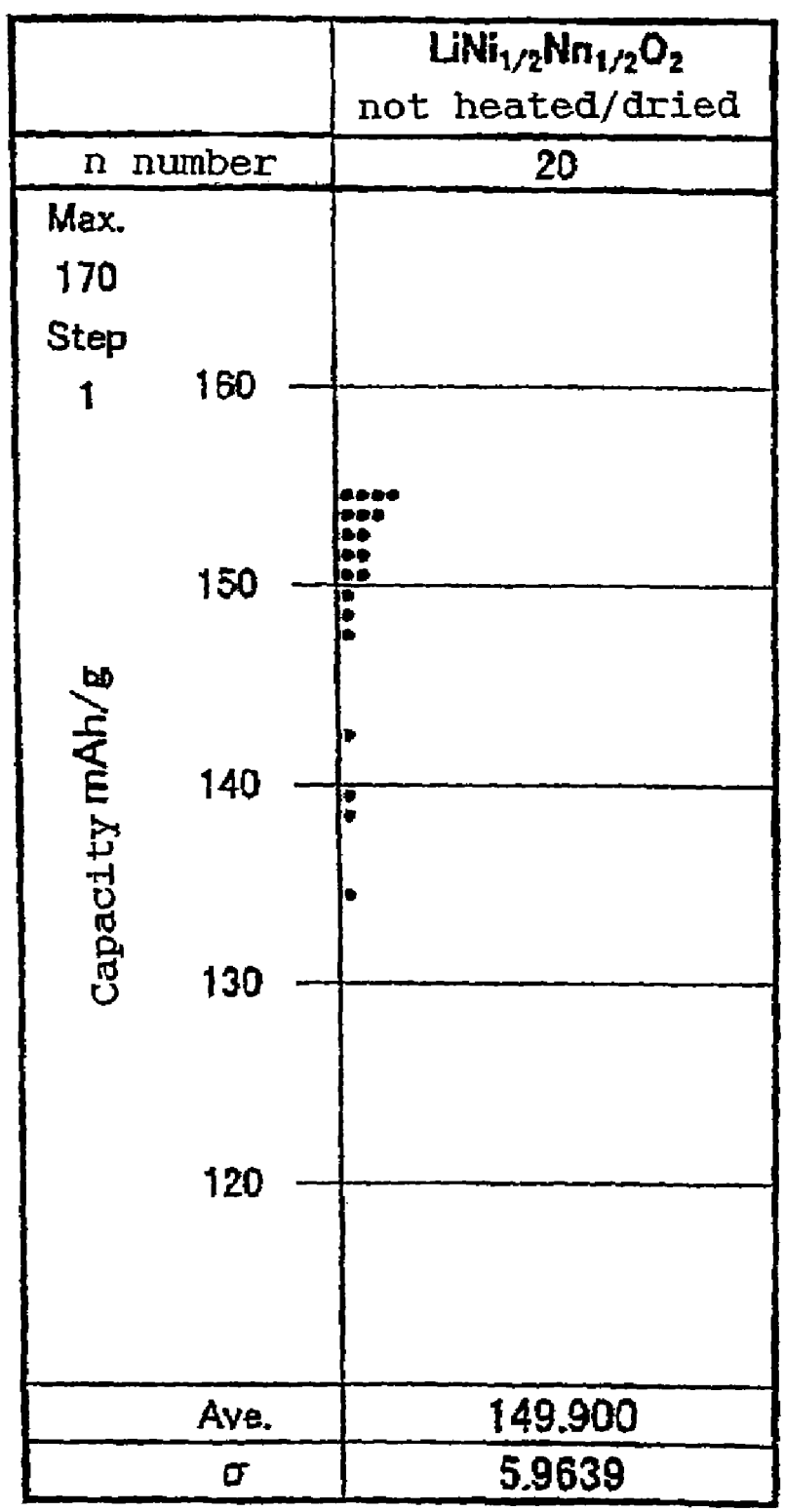
FIG. 7 is a graph showing a variation in discharge capacity of a coin type battery using $LiNi_{1/2}Mn_{1/2}Co_{1/2}O_2$ obtained by the use of the precursor in Comparative Example of the present invention.
Figure 8:
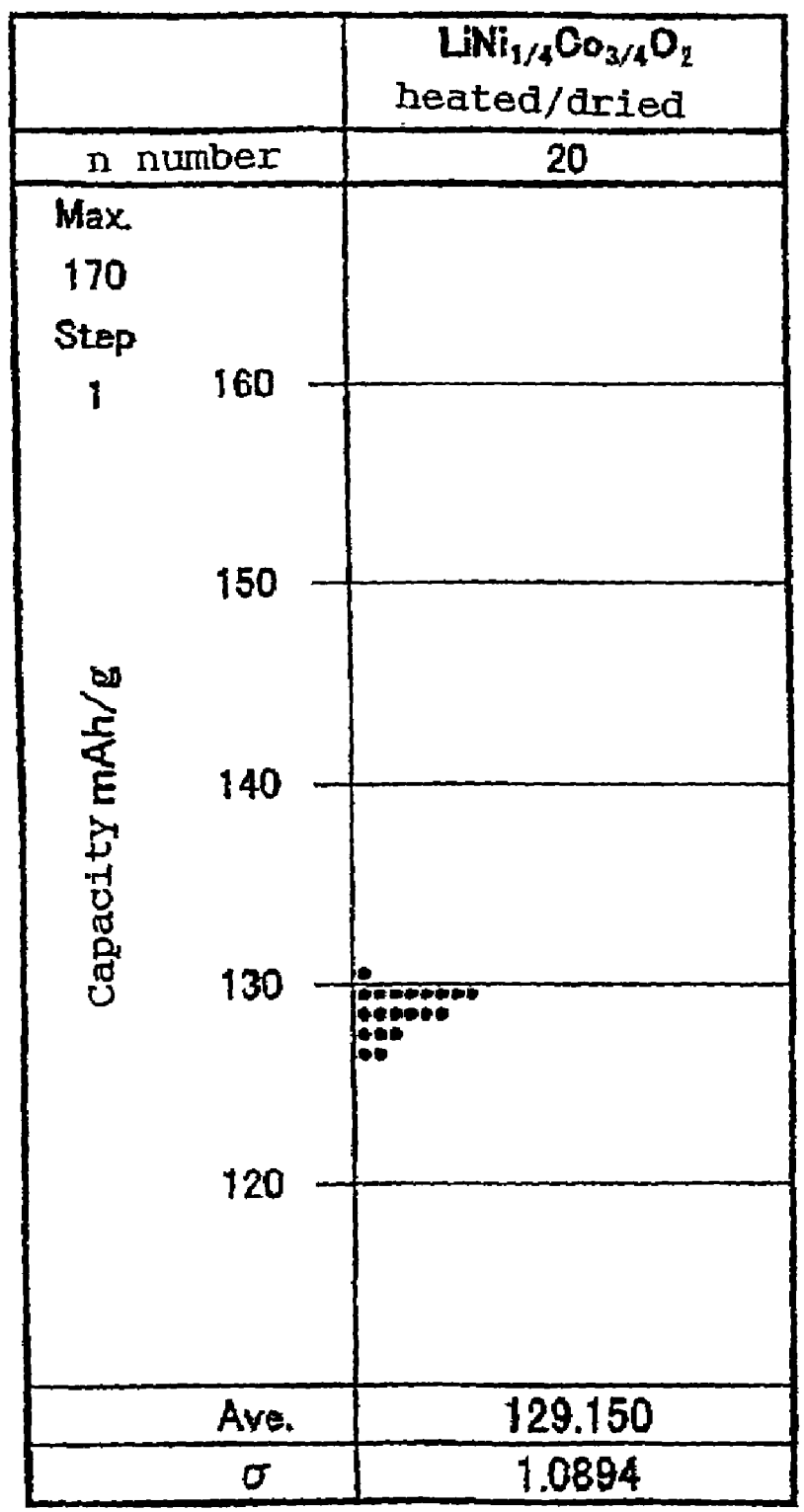
FIG. 8 is a graph showing a variation in discharge capacity of a coin type battery using $LiNi_{1/4}Co_{3/4}O_2$ obtained by the use of the dry precursor in Example of the present invention.
Figure 9:
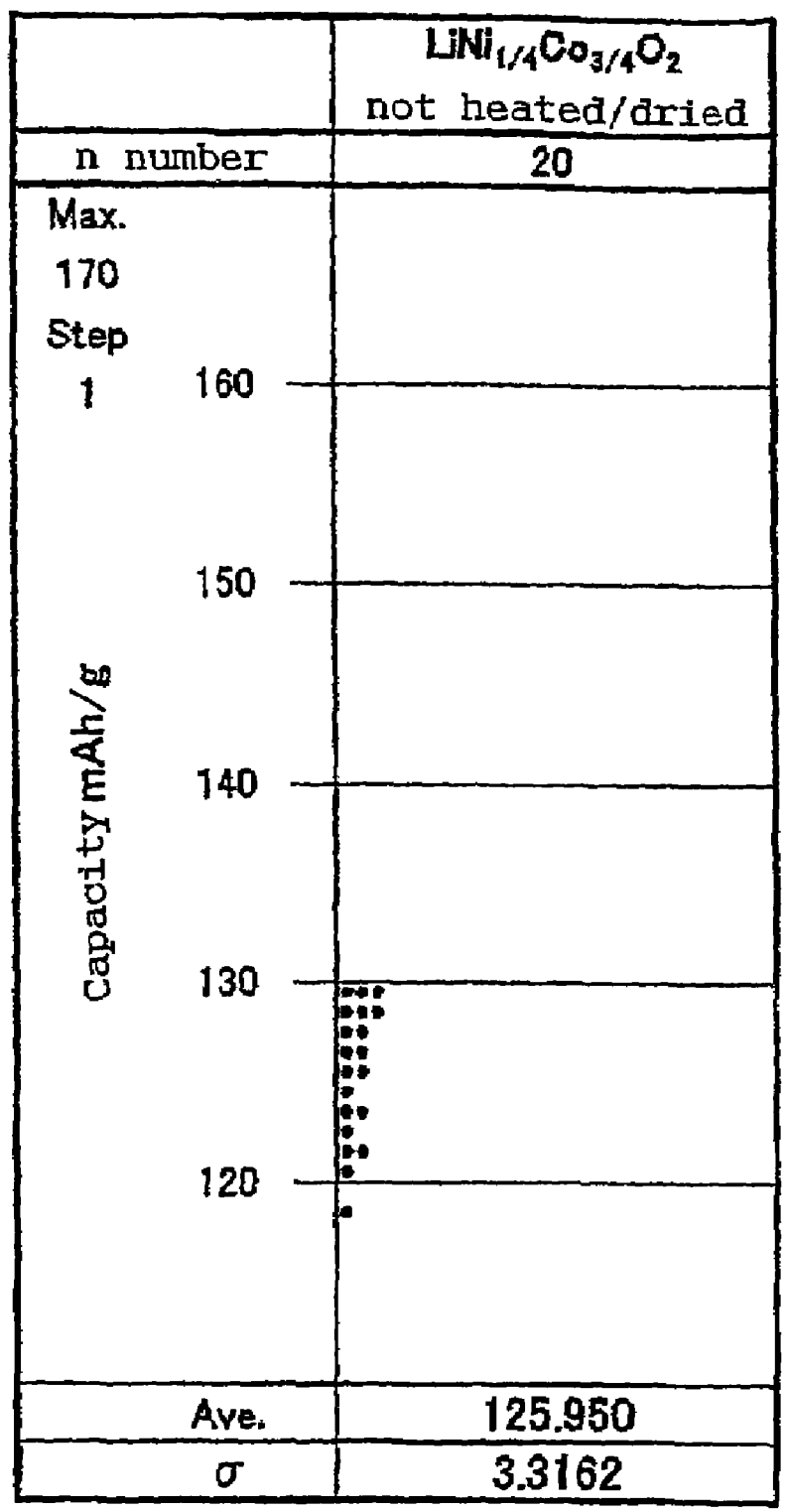
FIG. 9 is a graph showing a variation in discharge capacity of a coin type battery using $LiNi_{1/4}CO_{3/4}O_2$ obtained by the use of the precursor in Comparative Example of the present invention.

FIG. 3 is a partially schematic vertical cross sectional view representing a cylindrical battery.

An electrode plate group 14, formed by spirally winding a positive electrode plate and a negative electrode plate a plurality of times with a separator interposed therebetween, is accommodated in a battery case 11. A positive electrode lead 15 is brought out of the positive electrode plate and connected to a sealing plate 12, and a negative electrode lead 16 is brought out of the negative electrode plate and connected to the bottom of the battery case 11. A metal or alloy having electronic conductivity and resistance to organic electrolyte can be used for the battery case and the lead plates. Examples include such metals as iron, nickel, titanium, chromium, molybdenum, copper, aluminum and the alloys thereof. Among them, a stainless steel plate or an Al—Mn alloy plate is preferable for the battery case, while aluminum and nickel are most preferable for the positive electrode lead and the negative electrode lead, respectively. Alternatively, various kinds of engineering plastics and metals combined with such plastics may be used for the battery case so as to reduce the battery weight.

The top and bottom of the electrode plate group 14 are each provided with an insulating ring 17. In this condition, an electrolyte is charged, and the battery case is hermetically sealed with the sealing plate. At this time, a safety valve may be attached to the sealing plate. Instead of the safety valve, various other conventionally-known safety devices may also be used. For example, a fuse, a bimetal, a PTC device or the like can be used as an overcurrent protection device. Rather than attaching a safety valve, other methods, such as cutting a nick into the battery case, cracking the gasket or the sealing plate, or cutting off the lead plate, may be employed for protecting internal pressure rise of the battery case. Also, a protection circuit having an overcharge or overdischarge inhibiting function may be incorporated into a charger, or such a circuit may be connected separately.

Alternatively, a method that cuts off the current when the battery internal pressure rises can be employed as an overcharge protection measure. In this case, a compound that may raise the internal pressure can be added into the mixture or in the electrolyte. Such compounds include carbonates such as $Li_2CO_3$, $LiHCO_3$, $Na_2CO_3$, $NaHCO_3$, $CaCO_3$ and $MgCO_3$, for example. Known methods (e.g., DC or AC electric welding, laser welding, ultrasonic welding or the like) can be used for welding the cap, battery case, sheets, and lead plates. For the sealing agent used for sealing, a conventionally-known compound or mixture such as asphalt can be used.

The present invention will now be described with reference to representative examples, but it will be recognized that the invention is not limited to the particular examples given hereinafter.

EXAMPLES 1 TO 3 AND COMPARATIVE
EXAMPLES 1 TO 3

A positive electrode active material of the present invention and a positive electrode active material for comparison were produced in the following manner:

First, a 4.8 mol/l NaOH aqueous solution, a 4.8 mol/l $NH_3$ solution and a mixture of 1.2 mol/l nickel sulfate aqueous solution, a 1.2 mol/l manganese sulfate aqueous solution and a 1.2 mol/l cobalt sulfate aqueous solution were introduced into a reaction vessel 3 of the equipment shown in FIG. 2 at a rate of 0.5 ml/min to obtain a nickel manganese cobalt composite hydroxide as a precursor. Subsequently, this precursor was baked at 400° C. for 5 hours to obtain a dry precursor "a" comprising nickel, manganese and cobalt in proportions of 1:1:1.

The dry precursor "a" was mixed with lithium hydroxide so that the atomic ratio of Li, Ni, Mn and Co satisfied Li/(Ni+Mn+Co)=1, and the temperature was raised right up to 1000 □, at which the resulting mixture was baked for 10 hours. When the temperature was to be decreased after completion of baking, the mixture was annealed once at 700° C. for 5 hours and then slowly cooled so as to obtain a positive electrode active material "a" ($LiNi_{1/3}Mn_{1/3}Co_{1/3}O_2$) of the present invention composed of a lithium-containing transition metal oxide (Example 1).

Next, except that cobalt sulfate was not used, a nickel manganese oxide as the precursor was obtained, which was then heated and dried in the same manner as the above, to obtain a dry precursor "b" comprising nickel and manganese in proportions of 1:1. Herein, the X-ray diffraction patterns for the precursor (before drying) and the dry precursor "b" (after drying) were shown with (ii) and (i) in FIG. 1.

Further, the dry precursor "b" was mixed with lithium hydroxide so that the atomic ratio of Li, Ni and Mn satisfied Li/(Ni+Mn)=1, and the temperature was raised right up to 1000 □, at which the resulting mixture was baked at 1000° C. for 10 hours. When the temperature was to be decreased after completion of baking, the mixture was annealed once at 700° C. for 5 hours and then slowly cooled so as to obtain a positive electrode active material "b" ($LiNi_{1/2}Mn_{1/2}O_2$) of the present invention composed of a lithium-containing transition metal oxide (Example 2).

Moreover, except that the heating and drying step was not conducted, a positive electrode active material "c" ($LiNi_{1/3}Mn_{1/3}Co_{1/3}O_2$: Comparative Example 1) was obtained in the same manner with the positive electrode active material "a"; except that the heating and drying step was not conducted, a positive electrode active material "d" ($LiNi_{1/2}Mn_{1/2}O_2$: Comparative Example 2) was obtained in the same manner with the positive electrode active material "b".

Subsequently, the positive electrode active materials "a" to "d" were evaluated in the following manner:

[Evaluation 1]

The cylindrical battery shown in FIG. 3 was fabricated using the obtained positive electrode active material, and evaluations were made for the case of applying the positive electrode active material of the present invention to the cylindrical battery.

A positive electrode plate was produced as follows: 10 parts by weight of carbon powder as the electrically conductive material and 5 parts by weight of polyvinylidene fluoride resin as the binder were mixed together with 85 parts by weight of powder of the positive electrode active material of the present invention. The resulting mixture was then dispersed into dehydrated N-methylpyrrolidinone to obtain a slurry, which was then applied on the positive electrode current collector formed from an aluminum foil and, after drying and roll-pressing, the foil was cut to the specified size to obtain the positive electrode plate.

A carbonaceous material and a styrene-butadiene rubber type binder were mixed in a weight ratio of 100:5, and the resulting mixture was applied on both surfaces of a copper foil and, after drying and roll-pressing, the foil was cut to the specified size to obtain the negative electrode plate.

A microporous polyethylene film was used as the separator. An organic electrolyte was prepared by dissolving 1.5 mol/l of $LiPF_6$ into a solvent mixture of polyethylene carbonate and ethyl methyl carbonate in a volumetric ratio of 1:1. The fabricated cylindrical battery was 18 mm in diameter and 650 mm in height.

20 articles of the cylindrical batteries using the above positive electrode active materials "a" to "d" were fabricated and variations of the cycle life thereof were evaluated. Namely, the capacity degradation ratios after 300 cycles were calculated by the formula:

{(Capacity at the 3rd cycle)−(Capacity at the 300th cycle)}/(Capacity at the 3rd cycle)×100 (%)

The variations of those capacity degradation ratios σn−1 (n=20) were then calculated. The results were shown in Table 1.

TABLE 1

| | | | Variation of Capacity degradation ratio |
|---|---|---|---|
| a | Dried $LiNi_{1/3}Mn_{1/3}Co_{1/3}O_2$ | Ex. 1 | 1.33 |
| b | Non-dried $LiNi_{1/3}Mn_{1/3}Co_{1/3}O_2$ | Comp. Ex. 1 | 4.25 |
| c | Dried $LiNi_{1/2}Mn_{1/2}O_2$ | Ex. 2 | 1.30 |
| d | Non-dried $LiNi_{1/2}Mn_{1/2}O_2$ | Comp. Ex. 2 | 4.09 |

It is found from Table 1 that the variation in the capacity degradation of the battery is smaller when the positive electrode active material obtained using the dry precursor of the present invention was used.

[Evaluation 2]

Next, variations of discharge capacities in the case of applying the obtained positive electrode active materials "a" to "d" to the coin type battery were evaluated. It is to be noted that: dried $LiNi_{1/4}Mn_{3/4}O_2$ (Example 3), which was a positive electrode active material "e" of the present invention produced in the same manner with the positive electrode active material "a" except that manganese sulfate was not used and the amounts of nickel sulfate and cobalt sulfate were changed, was also used; non-dried $LiNi_{1/4}CO_{3/4}O_2$ (Comparative Example 3), which was a positive electrode active material "f" produced in the same manner with the positive electrode active material "e" except that the heating and drying step was not conducted, was also used.

Each coin battery was fabricated in accordance with the following procedure: The positive electrode active materials "a" to "d" obtained at the designated baking temperatures, acetylene black as the conductive material and a polyvinylidene fluoride resin (hereinafter referred to as "PVDF") as the binder were mixed in a weight ratio of 80:10:10, to form a molded article in the shape of sheet. The molded article was then punched in the shape of a disc and dried at a temperature of 80° C. for about 15 hours in vacuo, to obtain the positive electrode. On the other hand, a sheet made of lithium metal was punched in the shape of a disc to form the negative electrode. A microporous polyethylene film was used as the separator, and the electrolyte was prepared by dissolving 1 mol of LiPF6 into a solvent mixture of EC (ethylene carbonate) and EMC (ethyl methyl carbonate) in a volumetric ratio of 1:3.

Using these materials, a coin battery of 2016 size (20 mm in diameter and 1.6 mm in thickness) was fabricated by a conventional method, which was then discharged at 4.3 V at a constant current rate whereby the battery was fully charged in about 10 hours. The discharge capacities per gram of the positive electrode active materials were shown in FIGS. 4 to 9.

It is found from FIGS. 4 and 5, FIGS. 6 and 7, and FIGS. 8 and 9 that the battery obtained by using the positive electrode active material produced with the dry precursor of the present invention exhibits a smaller variation in discharge capacity thereof.

According to the present invention, important factors for synthesizing an optimum active material are made clear by a synthesis method of a composite oxide mainly comprising transition metal elements so that a high-performance positive electrode active material with little variation in performance thereof can surely be fabricated with ease.

Although the present invention has been described in terms of the presently preferable embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A production method of a positive electrode active material for a non-aqueous electrolyte battery, comprising the steps of:

introducing into a reaction vessel an alkaline solution and an aqueous solution containing two or more transition metal salts or two or more aqueous solutions containing different transition metal salts;

coprecipitating using a reductant or an inert gas to obtain a hydroxide or an oxide precursor of at least two transition metals;

drying said hydroxide or oxide at 300 to 500° C. to obtain a dry precursor; and baking a mixture of said dry precursor and a lithium compound at a temperature of 900° C. to 1200° C. to obtain a lithium-containing transition metal oxide, wherein the lithium-containing transition metal oxide contains Mn and Ni in a 1:1 molar ratio.

2. The production method of a positive electrode active material for a non-aqueous electrolyte battery in accordance with claim 1, wherein said lithium compound is lithium carbonate and/or lithium hydroxide.

3. The production method of a positive electrode active material for a non-aqueous electrolyte battery in accordance with claim 1, wherein said lithium-containing transition metal oxide is represented by Formula (1):

$$Li[Li_x(Ni_yMn_{1-y})_{1-x}]O_2,$$

where $0 \leq x \leq 0.3$ and $y=0.5$.

4. The production method of a positive electrode active material for a non-aqueous electrolyte battery in accordance with claim 1, wherein said lithium-containing transition metal oxide is represented by Formula (2):

$$Li[Li_x(Ni_pMn_pC_r)_{1-x}]O_2,$$

where C is a transition metal other than Ni and Mn, $0 \leq x \leq 0.3$, $0<P<1$, and $0<R<1$.

5. The production method of a positive electrode active material for a non-aqueous electrolyte battery in accordance with claim 4, wherein C is cobalt and/or iron.

6. The production method of a positive electrode active material for a non-aqueous electrolyte battery in accordance with claim 1, further comprising a step of doping a different kind of element into the surface of a crystal particle of said lithium-containing transition metal oxide.

7. The production method of a positive electrode active material for a non-aqueous electrolyte battery in accordance with claim 6, wherein said different kind of element is at least one selected from the group consisting of aluminum, magnesium, calcium, strontium, yttrium and ytterbium.

8. The production method of a positive electrode active material for a non-aqueous electrolyte battery in accordance with claim 6, wherein a proportion of said different kind of element to the total of said transition metal elements is from 0.05 to 20 mol %.

* * * * *

UNITED STATES PATENT AND TRADEMARK OFFICE
CERTIFICATE OF CORRECTION

PATENT NO. : 7,579,114 B2
APPLICATION NO. : 11/531887
DATED : August 25, 2009
INVENTOR(S) : Tsutomu Shzuku et al.

It is certified that error appears in the above-identified patent and that said Letters Patent is hereby corrected as shown below:

Column 2, line 2:
"LixNi$_{2-x-y}$MnyO$_2$" should read -- Li$_x$Ni$_{2-x-y}$Mn$_y$O$_2$ --;

Column 16, line 28 and 45:
"1000☐" should read -- 1000°C --;

Column 17, line 59:
"LiNi$_{1/4}$CO$_{3/4}$O$_2$" should read -- LiNi$_{1/4}$Co$_{3/4}$O$_2$ --.

Signed and Sealed this

Twenty-third Day of February, 2010

David J. Kappos
*Director of the United States Patent and Trademark Office*